US012531126B2

(12) United States Patent
Jung et al.

(10) Patent No.: US 12,531,126 B2
(45) Date of Patent: Jan. 20, 2026

(54) MEMORY DEVICE FOR PERFORMING READ OPERATION

(71) Applicant: SK hynix Inc., Icheon-si (KR)

(72) Inventors: Jae Yeop Jung, Icheon-si (KR); Dong Hun Kwak, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 152 days.

(21) Appl. No.: 18/453,113

(22) Filed: Aug. 21, 2023

(65) Prior Publication Data
US 2024/0290394 A1    Aug. 29, 2024

(30) Foreign Application Priority Data

Feb. 28, 2023   (KR) ........................ 10-2023-0026644

(51) Int. Cl.
*G11C 16/04* (2006.01)
*G11C 16/08* (2006.01)
*G11C 16/26* (2006.01)
*G11C 16/34* (2006.01)

(52) U.S. Cl.
CPC .......... *G11C 16/26* (2013.01); *G11C 16/0483* (2013.01); *G11C 16/08* (2013.01); *G11C 16/3422* (2013.01); *G11C 16/3427* (2013.01)

(58) Field of Classification Search
CPC ..... G11C 16/26; G11C 16/0483; G11C 16/08; G11C 16/3422; G11C 16/3427; G11C 11/5642; G11C 8/14; G11C 16/3418

USPC ..................................................... 365/185.02
See application file for complete search history.

(56) References Cited

U.S. PATENT DOCUMENTS 8,670,285 B2 *   3/2014   Dong .................. G11C 11/5642
                                                          365/206
9,240,245 B1     1/2016   Bellorado et al.
9,747,992 B1 *   8/2017   Chen ...................... G11C 16/04

FOREIGN PATENT DOCUMENTS

KR    1020140036259 A    3/2014
KR    1020220013158 A    2/2022

* cited by examiner

*Primary Examiner* — Tha-O H Bui
(74) *Attorney, Agent, or Firm* — WILLIAM PARK AND ASSOCIATES LTD.

(57) ABSTRACT

A memory device includes: a plurality of memory cell strings including a plurality of memory cells connected to a plurality of word lines; a peripheral circuit for performing a read operation that reads data stored selected memory cells connected to a selected word line among the plurality of word lines; and a read operation controller for controlling the peripheral circuit to perform the read operation in a first mode or a second mode, based on a result obtained by performing a disturb sensing operation that identifies a degree to which a threshold voltage of dummy memory cells connected to a dummy word line is changed when the selected word line is included in weak word line information.

20 Claims, 11 Drawing Sheets

MEMORY DEVICE FOR PERFORMING READ OPERATION

CROSS-REFERENCE TO RELATED APPLICATION

The present application claims priority under 35 U.S.C. § 119(a) to Korean patent application number 10-2023-0026644 filed on Feb. 28, 2023, in the Korean Intellectual Property Office, the entire disclosure of which is incorporated by reference herein.

BACKGROUND

1. Technical Field

The present disclosure generally relates to an electronic device, and more particularly, to a memory device for performing a read operation.

2. Related Art

A memory system is a device that stores data under the control of a host device, such as a computer or a smart phone. The memory system may include a memory device for storing data and a memory controller for controlling the memory device. The memory device is classified into a volatile memory device and a nonvolatile memory device.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

The nonvolatile memory device may be designed in a multi-memory cell string structure so as to increase the degree of integration of memory cells. The nonvolatile memory device may increase a channel potential of unselected memory cell strings in a read operation that reads data stored in memory cells, thereby improving the performance of the read operation. However, a threshold voltage distribution of memory cells may be changed due to an influence of the magnitude of the channel potential of the unselected memory cell strings. When a magnitude of which the channel potential of the unselected memory cell strings increases is adjusted by controlling voltages applied in the read operation, the change in the threshold voltage distribution of the memory cells may be reduced.

SUMMARY

In accordance with an aspect of the present disclosure, there is provided a memory device including: a plurality of memory cell strings including a plurality of memory cells connected to a plurality of word lines; a peripheral circuit configured to perform a read operation that reads data stored selected memory cells connected to a selected word line among the plurality of word lines; and a read operation controller configured to control the peripheral circuit to perform the read operation in a first mode or a second mode, based on a result obtained by performing a disturb sensing operation that identifies a degree to which a threshold voltage of dummy memory cells connected to a dummy word line is changed when the selected word line is included in weak word line information, wherein an extent to which a magnitude of a channel potential of unselected memory cell strings, among the plurality of memory cell strings, increases in the first mode is smaller than an extent to which a magnitude of the channel potential of the unselected memory cell strings increases in the second mode.

In accordance with another aspect of the present disclosure, there is provided a memory device including: a plurality of memory cell strings including a plurality of memory cells connected to a plurality of word lines; a peripheral circuit configured to perform a read operation that reads data stored selected memory cells connected to a selected word line among the plurality of word lines; and a read operation controller configured to, in the read operation, control the peripheral circuit to change an extent to which the magnitude of a channel potential of unselected memory cell strings among the plurality of memory cell strings increases according to a position of the selected word line.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Embodiments provide a memory device capable of reducing a disturbance phenomenon in which a threshold voltage distribution of memory cell is changed in a read operation.

Figure 1:
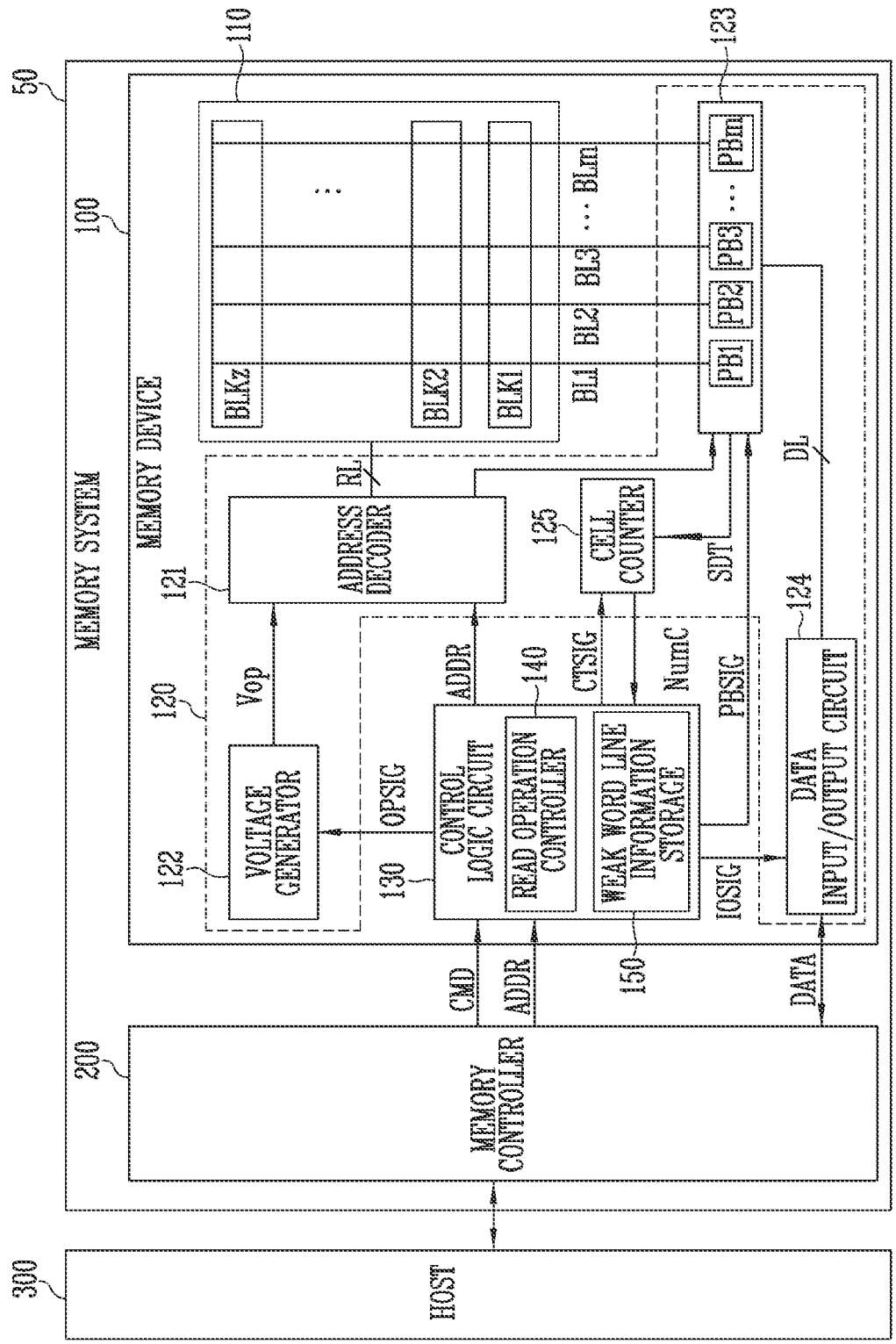
FIG. 1 is a diagram illustrating a memory system including a memory device in accordance with an embodiment of the present disclosure.

FIG. 1 is a diagram illustrating a memory system including a memory device in accordance with an embodiment of the present disclosure.

Referring to FIG. 1, the memory system 50 may include a memory device 100 and a memory controller 200. The memory system 50 may be a device that is included in a mobile phone, a computer, or the like, and may be a device that stores data under the control of a host 300 as an external device. The memory system 50 may be manufactured as any one of various types of storage devices, such as a Solid State Drive (SDD) and a Universal Flash Storage (UFS), according to a host interface as a communication scheme with the host 300. The memory system 50 may be manufactured as any one of various kinds of package types, such as a System On Chip (SOC).

The memory device 100 may store data. The memory device 100 may operate under the control of the memory controller 200. In an embodiment, the memory device 100 may be a nonvolatile memory device or a volatile memory device.

The memory device 100 may receive a command CMD and an address ADDR from the memory controller 200 and may perform an operation indicated by the command CMD on an area selected by the address ADDR. The memory device 100 may a program operation (write operation) that stores data in the area selected by the address ADDR, a read operation that reads data from the area selected by the address ADDR, or an erase operation that erases data in the area selected by the address ADDR.

In an embodiment, the memory device 100 may include a memory cell array 110, a peripheral circuit 120, and a control logic circuit 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a page buffer group 123 through bit lines BL1 to BLm. Each of the plurality of memory blocks BLK1 to BLKz may include a plurality of memory cells. In an embodiment, the plurality of memory cells may be nonvolatile memory cells.

Each of the plurality of memory cells may be configured as a Single Level Cell (SLC) storing one-bit data, a Multi-Level Cell (MLC) storing two-bit data, a Triple Level Cell (TLC) storing three-bit data, a Quad Level Cell (QLC) storing four-bit data, or a memory cell storing five-or-more-bit data.

The peripheral circuit 120 may drive the memory cell array 110. For example, the peripheral circuit 120 may drive the memory cell array 110 to perform a program operation, a read operation, and an erase operation under the control of the control logic circuit 130. In another example, the peripheral circuit 120 may apply various operating voltages to the row lines RL and the bit lines BL1 to BLm or may discharge the applied voltages under the control of the control logic circuit 130.

The peripheral circuit 120 may include the address decoder 121, a voltage generator 122, the page buffer group 123, a data input/output circuit 124, and a cell counter 125.

The address decoder 121 may be connected to the memory cell array 110 through the row lines RL. The row lines RL may include drain select lines, dummy word lines, a plurality of word lines, and source select lines.

The address decoder 121 may be operated under the control of the control logic circuit 130. The address decoder 121 may receive an address ADDR from the control logic circuit 130.

The address decoder 121 may decode a block address in the received address ADDR. The address decoder 121 may select at least one memory block, among the memory blocks BLK1 to BLKz, according to the decoded block address. The address decoder 121 may decode a row address in the received address ADDR. The address decoder 121 may select at least one word line WL of the selected memory block by applying voltages provided from the voltage generator 122 to the at least one word line according to the decoded row address.

In a program operation, the address decoder 121 may apply a program voltage to the selected word line and may apply a pass voltage having a lower level than the program voltage to unselected word lines. In a program verify operation, the address decoder 121 may apply a verify voltage to the selected word line and may apply a verify pass voltage having a higher level than the verify voltage to the unselected word lines.

In a read operation, the address decoder 121 may apply a read voltage to the selected word line and may apply a read pass voltage having a higher level than the read voltage to the unselected word lines.

The address decoder 121 may decode a column address in the received address ADDR. The decoded column address may be transferred to the page buffer group 123. For example, the address decoder 121 may include components, such as a row decoder, a column decoder, and an address buffer.

The voltage generator 122 may generate a plurality of operating voltages Vop by using an external power voltage supplied to the memory device 100. The voltage generator 122 may be operated under the control of the control logic circuit 130.

In an embodiment, the voltage generator 122 may generate various operating voltages Vop that are used for program, read, and erase operations in response to an operation signal OPSIG. For example, the voltage generator 122 may generate a plurality of erase voltages, a plurality of program voltages, a plurality of pass voltages, a plurality of select read voltages, and a plurality of unselect read voltages. The plurality of generated operating voltages Vop may be supplied to the memory cell array 110 by the address decoder 121.

The page buffer group 123 may include first to mth page buffers PB1 to PBm. The first to mth page buffers PB1 to PBm may be connected to the memory cell array 110, respectively, through first to mth bit lines BL1 to BLm. The first to mth page buffers PB1 to PBm may be operated under the control of the control logic circuit 130.

The first to mth page buffers PB1 to PBm may communicate by receiving and outputting data DATA with the data input/output circuit 124. In a program operation, the first to mth page buffers PB1 to PBm may receive data DATA through the data input/output circuit 124 and data lines DL.

In a program operation, the first to mth page buffers PB1 to PBm may transfer data DATA received through the data input/output circuit 124 to selected memory cells through the bit lines BL1 to BLm. The selected memory cells may be programmed according to the transferred data DATA. A memory cell connected to a bit line through which a program allow voltage (e.g., a ground voltage) is applied may have an increased threshold voltage. A threshold voltage of a memory cell connected to a bit line through which a program inhibit voltage (e.g., a power voltage) is applied may be maintained. In a verify operation, the first to mth page buffers PB1 to PBm may read data DATA stored in the selected memory cells from the selected memory cells through the bit lines BL1 to BLm.

In a read operation, the page buffer group 123 may sense data from memory cells of a selected word line through the bit lines BL1 to BLm and may store the sensed data in the first to mth page buffers PB1 to PBm.

The data input/output circuit 124 may be connected to the first to mth page buffers PB1 to PBm through the data lines DL. The data input/output circuit 124 may be operated under the control of the control logic circuit 130.

The data input/output circuit 124 may include a plurality of input/output buffers (not shown) that receive input data DATA. In a program operation, the data input/output circuit 124 may receive data DATA to be stored from the memory controller 200.

The cell counter 125 may receive data SDT sensed from the page buffer group 123. The cell counter 125 may count the number of fail bits included in the sensed data in response to a count signal CTSIG of the control logic circuit 130.

In an embodiment, the cell counter 125 may count the number of on-cells, among the memory cells, having a threshold voltage that is lower than a read voltage. In another embodiment, the cell counter 125 may count the number of off-cells, among the memory cells, having a threshold voltage that is higher than the read voltage. The cell counter 125 may provide information NumC regarding the counted number of off-cells to the control logic circuit 130.

The control logic circuit 130 may be connected to the address decoder 121, the voltage generator 122, the page buffer group 123, the data input/output circuit 124, and the cell counter 125. The control logic circuit 130 may control a general operation of the memory device 100. The control logic circuit 130 may be operated in response to a command CMD transferred from the memory controller 200.

The control logic circuit 130 may control the peripheral circuit 120 by generating several signals in response to a command CMD and an address ADDR. For example, the control logic circuit 130 may generate the operation signal OPSIG, the address ADDR, a page buffer control signal PBSIG, and the count signal CTSIG in response to the command CMD and the address ADDR. The control logic circuit 130 may output the operation signal OPSIG to the voltage generator 122, output the address ADDR to the address decoder 121, output the page buffer control signal PBSIG to the page buffer group 123, and output count signal CTSIG to the cell counter 125.

In an embodiment, the control logic circuit 130 may include a read operation controller 140 and a weak word line information storage 150.

The weak word line information storage 150 may store weak word line information corresponding to weak word lines, among a plurality of word lines. The weak word line information may include information regarding word lines respectively connected to top areas of a first channel region and a second channel region, which are formed by different pillar structures. The weak word line information may be read from any one memory block, among the plurality of memory blocks BLK1 to BLKz.

The read operation controller 140 may control the peripheral circuit 120 to perform a read operation on memory cells. The read operation may be an operation that reads data stored in the memory cells. In an embodiment, during the read operation, the read operation controller 140 may control the peripheral circuit 120 to apply an initial voltage to a plurality of word lines and may apply a pass voltage to the plurality of word lines, and then the read operation controller 140 may control the peripheral circuit 120 to apply a read voltage to a selected word line, among the plurality of word lines. In an embodiment, during the read operation, the read operation controller 140 may control the peripheral circuit 120 to apply a turn-on voltage to unselected select lines connected to an unselected memory cell string, among a plurality of memory cell strings, and then may apply a ground voltage to the unselected select lines.

In an embodiment, during the read operation, the read operation controller 140 may select a word line, among the plurality of word lines, corresponding to an address ADDR input from the memory controller 200. Based on a result obtained by comparing the selected word line with the weak word line information, the read operation controller 140 may determine whether the selected word line is included in the weak word line information.

When the selected word line is included in the weak word line information, the read operation controller 140 may control the peripheral circuit 120 to perform a disturb sensing operation that identifies a degree to which a threshold voltage of dummy memory cells connected to a dummy word line is changed. For example, the dummy word line may be a word line connected between a drain select word line and the plurality of word lines. The dummy line may be a word line connected between a source select line and the plurality of word lines. The dummy word line may be a word line connected between different pillar structures.

The disturb sensing operation may be an operation that identifies whether the threshold voltage of the dummy memory cells is higher than a disturb voltage by applying the disturb voltage to the dummy word line. In an embodiment, during the disturb sensing operation, the cell counter 125 may count a number of off-cells, among the dummy memory cells, having a threshold voltage that is higher than the disturb voltage. The cell counter 125 may provide information regarding the number of off-cells to the operation controller 140.

The read operation controller 140 may control the peripheral circuit 120 to perform the read operation in any one of a first mode and a second mode based on a result obtained by comparing the number of off-cells with a reference off-cell number, the result obtained by performing the disturb sensing operation. In the first mode, a magnitude of which a channel potential of the unselected memory cell strings, among the plurality of memory cell strings, increases may be smaller than a magnitude of which the channel potential of the unselected memory cell strings increases in the second mode.

In an embodiment, the magnitude of which a channel potential of the unselected memory cell strings, among the plurality of memory cell strings, increases may be determined based on a boosting ratio.

The boosting ratio may be a ratio of a voltage magnitude of unselected word lines, among the plurality of word lines, which increases after unselected select transistors connected to the unselected select lines are turned off, with respect to a magnitude difference between the pass voltage and the initial voltage, which are applied to the unselected word lines. The boosting ratio may be determined based on at least one of a magnitude of the initial voltage, a magnitude of the pass voltage, and a time for which the turn-on voltage is applied to the unselected select lines connected to the unselected memory cell strings.

In an embodiment, the read operation controller 140 may control the peripheral circuit 120 to change the boosting ratio according to a position of the selected word line. The boosting ratio may have a smaller value as the selected word line is located closer to the top area of the first channel region or the second channel region. The boosting ratio may have a larger value as the selected word line is located closer to a bottom area of the first channel region or the second channel region. The boosting ratio may have a smaller value as the magnitude of the initial voltage or the magnitude of the pass voltage becomes smaller or as the time for which the turn-on voltage is applied to the unselected select lines connected to the unselected memory cell strings becomes longer.

The memory controller 200 may control overall operations of the storage system 50.

The memory controller 200 may control the memory device 100 to perform a program operation, a read operation, an erase operation, or the like according to a request of the host 300. The memory controller 200 may provide a command, a physical address, or data to the memory device 100 according to the program operation, the read operation, or the erase operation.

In an embodiment, the memory controller 200 may autonomously generate a command, an address, and data, regardless of any request from the host 300, and may transmit the command, the address, and the data to the memory device 100. For example, the memory controller 200 may provide the memory device 100 with a command, an address, and data, which are used to perform read and program operations accompanied in performing wear leveling, read reclaim, garbage collection, or the like.

The host 300 may communicate with the memory system 50 by using various communication schemes.

Figure 2:
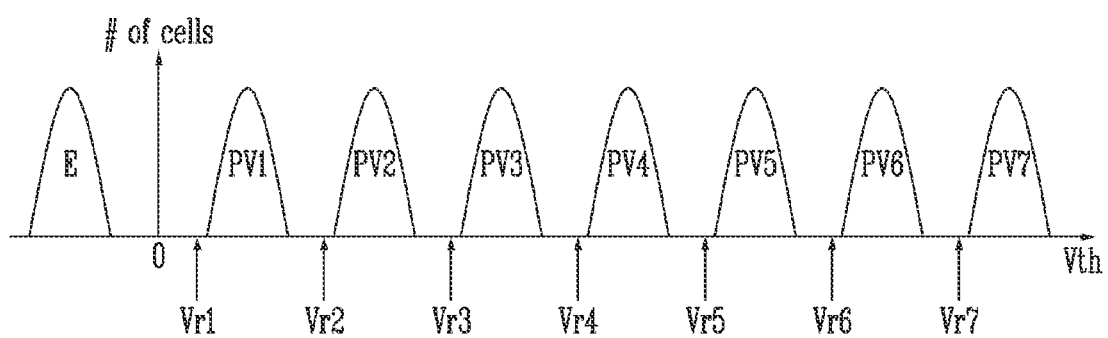
FIG. 2 is a diagram illustrating a threshold voltage distribution of memory cells.

FIG. 2 is a diagram illustrating a threshold voltage distribution of memory cells.

In FIG. 2, the horizontal axis of a graph represents threshold voltage Vth of memory cells, and the vertical axis of the graph represents number of memory cells (# of cells).

In FIG. 2, a case in which one memory cell is programmed as a Triple Level Cell (TLC) storing three-bit data will be described as an example. The embodiment of the present disclosure may be identically applied when one memory cell stores two-or-less-bit data or when one memory cell stores four-or-more-bit data.

Referring to FIG. 2, a threshold voltage distribution of memory cells may increase to a threshold voltage corresponding to any one state, among an erase state E and first to seventh program states PV1 to PV7 through a program operation. Data stored in the memory cells may vary according to the program state of the memory cells. The memory cells may store different data according to which state, among the erase state E and the first to seventh program states PV1 to PV7, the threshold voltage of the memory cells corresponds to.

The memory device 100 may perform a read operation that acquires data stored in memory cells by using read voltages that distinguish program states from each other. First to seventh read voltages Vr1 to Vr7 may be voltages that distinguish the erase state E and the first to seventh program states PV1 to PV7 from each other.

Figure 3:
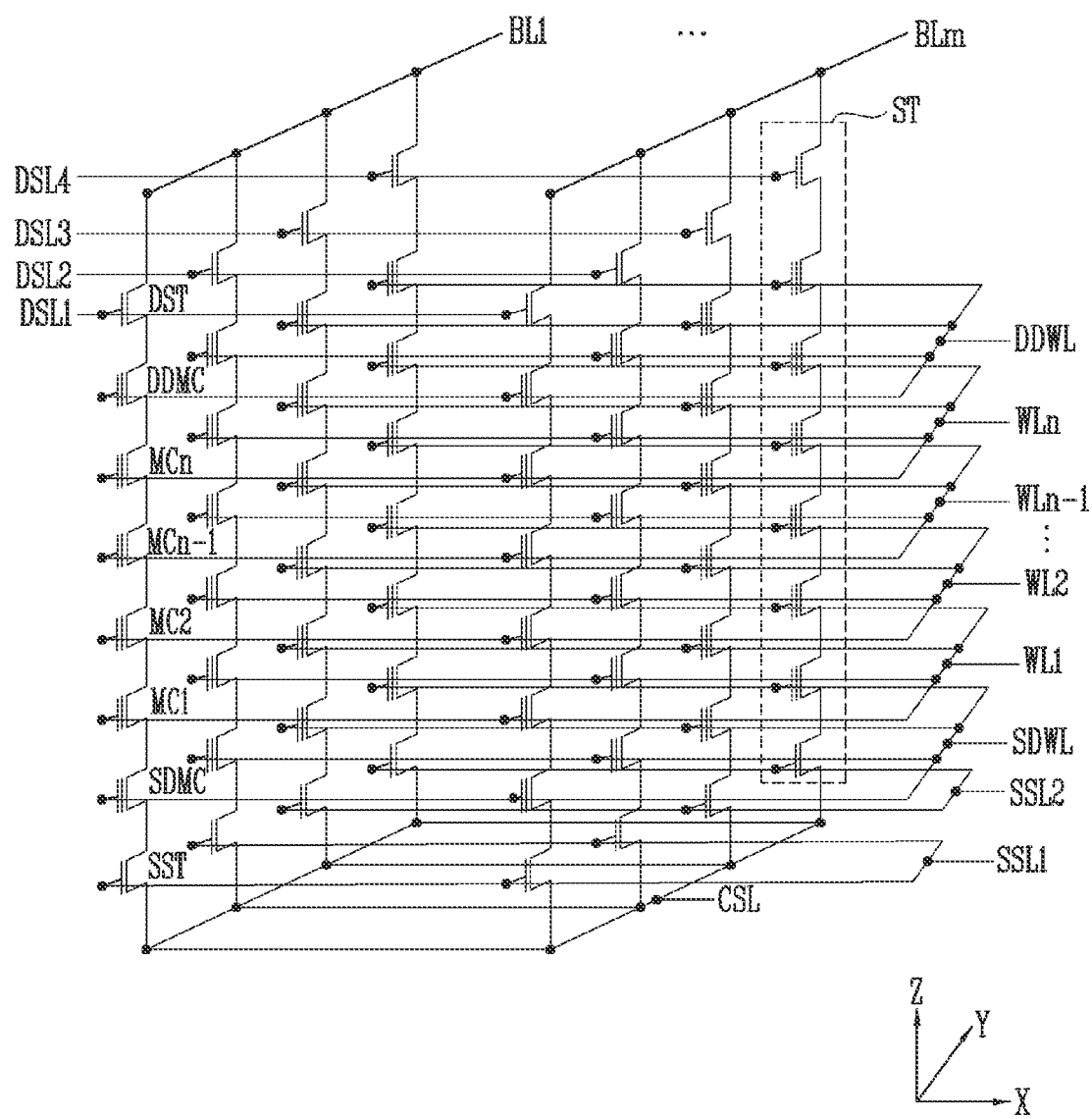
FIG. 3 is a diagram illustrating any one memory block among a plurality of memory blocks.

FIG. 3 is a diagram illustrating any one memory block, among a plurality of memory blocks.

Referring to FIG. 3, any one memory block may include a plurality of memory cell strings ST. The plurality of memory cell strings may be connected between bit lines BL1 to BLm and a common source line CSL. The plurality of memory cell strings may be commonly connected to the common source line CSL. Each memory cell string ST may include a drain select transistor DST, a plurality of memory cells MC1 to MCn, and a source select transistor SST. The drain select transistor DST may be connected to a drain select line DSL, and the source select transistor SST may be a source select line SSL. Memory cells on the same row (X direction), among a plurality of memory cells, may be connected to one word line.

Each memory cell string ST may include a drain-side dummy memory cell DDMC connected between the drain select transistor DST and an nth memory cell MCn. The drain-side dummy memory cell DDMC may be connected to a drain-side dummy word line DDWL. Each memory cell string ST may include a source-side dummy memory cell SDMC connected between the source select transistor SST and a first memory cell MC1. The source-side dummy memory cell SDMC may be connected to a source-side dummy word line SDWL.

Memory cells connected to one word line may constitute a plurality of physical pages. The number of physical pages included in one word line may be determined according to a number of memory cell strings commonly connected to one bit line. For example, when four memory cell strings are commonly connected to one bit line, the one word line may include four physical pages.

One physical page may include a plurality of logical pages. The number of logical pages included in one physical page may be determined according to a number of bits to be stored in a memory cell. For example, when the memory cell is programmed as the TLC, one physical page may include three logical pages, and the three physical pages may include a Least Significant Bit (LSB) page, a Central Significant Bit (CSB) page, and a Most Significant Bit (MSB) page.

Figure 4:
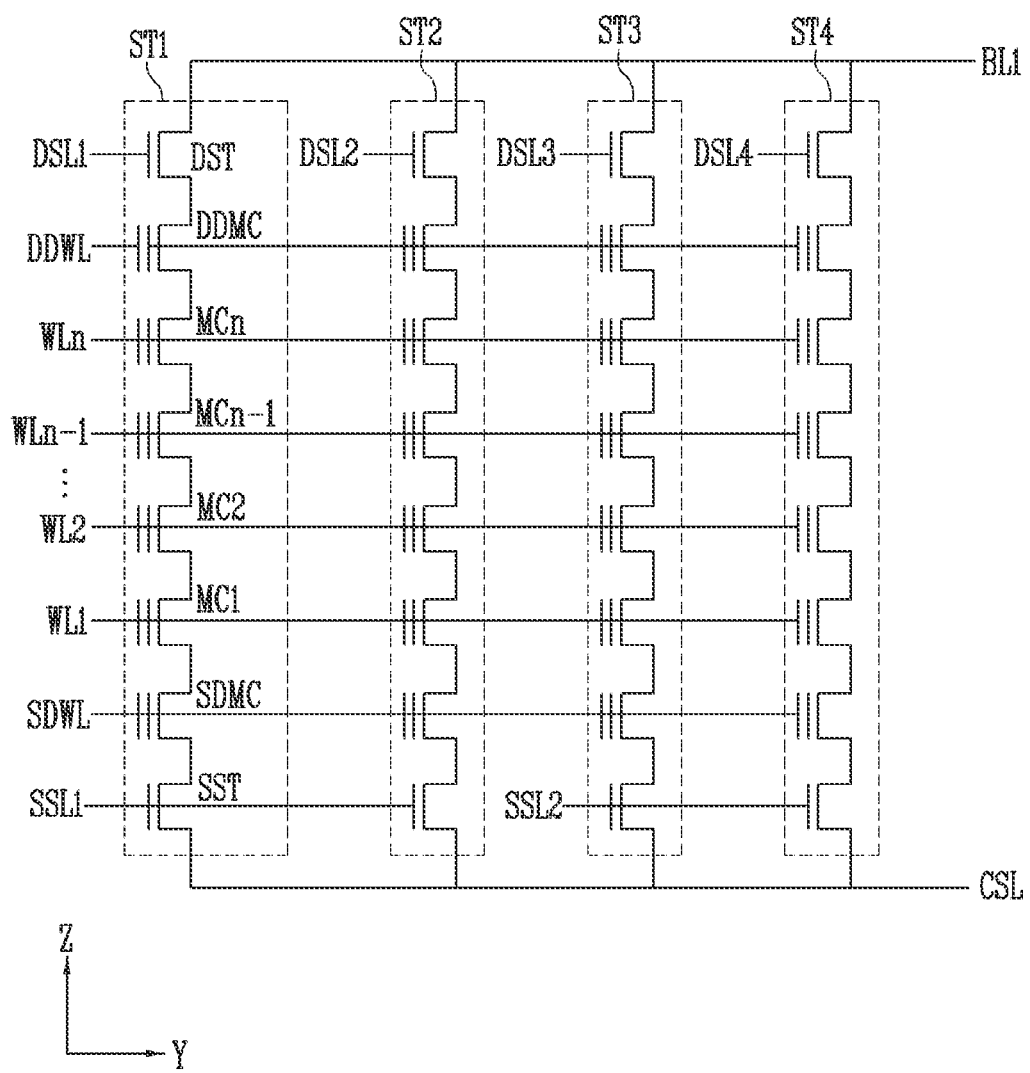
FIG. 4 is a diagram illustrating memory cell strings included in any one memory block.

FIG. 4 is a diagram illustrating memory cell strings included in any one memory block.

FIG. 4 will be described with reference to FIG. 3. Referring to FIG. 4, first to fourth memory cell strings ST1 to ST4 may be connected between a first bit line BL1 and the common source line CSL. The first to fourth memory cell strings ST1 to ST4 may be connected to different drain select lines. The first to fourth memory cell strings ST1 to ST4 may be respectively connected to first to fourth drain select lines DSL1 to DSL4.

The first and second memory cell strings ST1 and ST2 and the third and fourth memory cell strings ST3 and ST4 may be connected to different source select lines. The first and second memory cell strings ST1 and ST2 may be commonly connected to a first source select line SSL1, and the third and fourth memory cell strings ST3 and ST4 may be commonly connected to a second source select line SSL2.

Each memory cell string may include a drain select transistor DST, a drain-side dummy memory cell DDMC, a plurality of memory cells MC1 to MCn, a source-side dummy memory cell SDMC, and a source select transistor SST. The plurality of memory cells MC1 to MCn may be respectively connected to a plurality of word lines WL1 to WLn.

Figure 5:
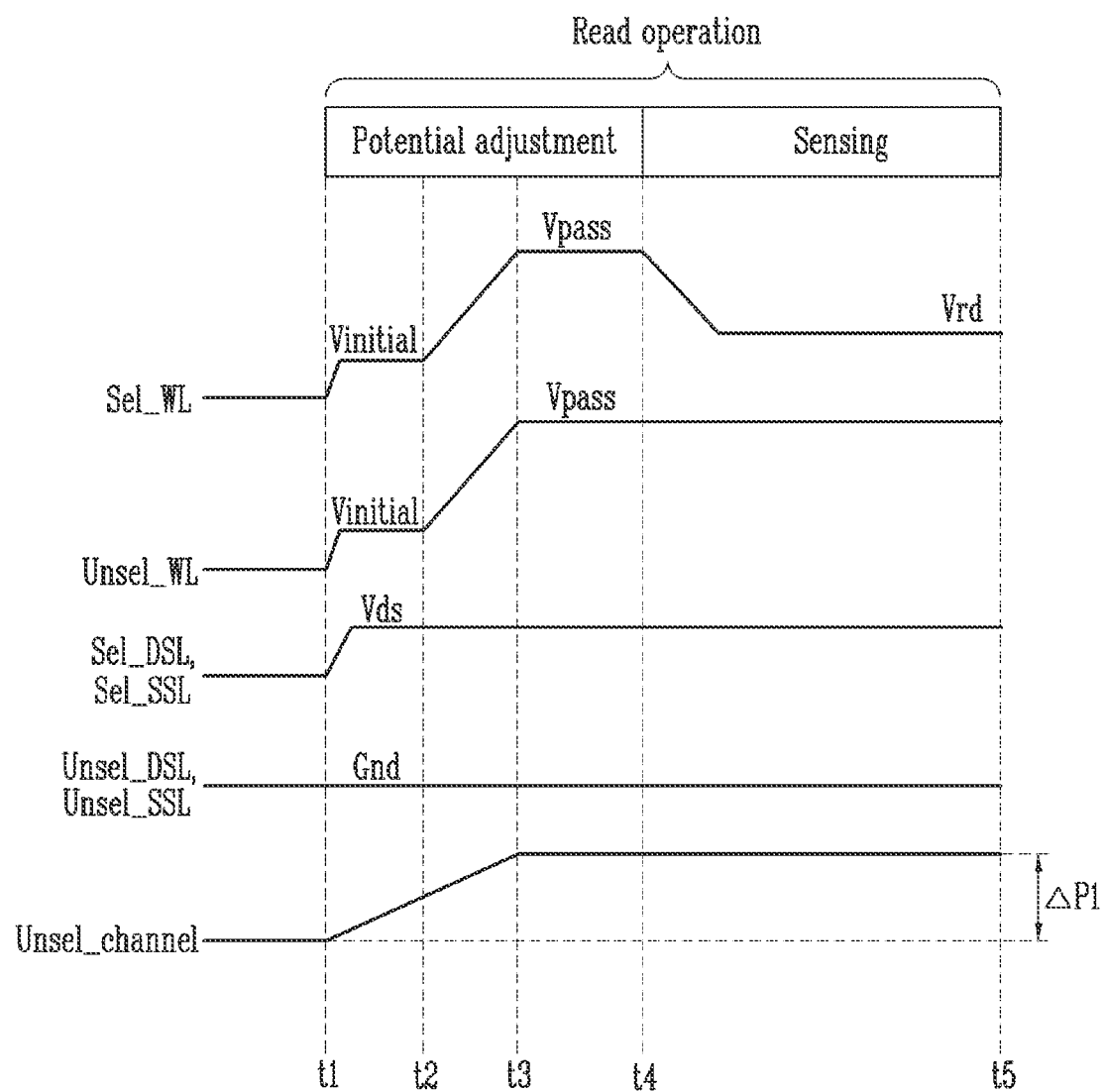
FIG. 5 is a diagram illustrating a read operation of the memory device.

FIG. 5 is a diagram illustrating a read operation of the memory device.

Referring to FIG. 5, the memory device 100 may perform a read operation that reads data stored in selected memory cells, among a plurality of memory cells. The read operation may include a potential adjustment period Potential adjustment and a sensing period Sensing.

In FIG. 5, the first memory cell string ST1, among the first to fourth memory cell strings ST1 to ST4, shown in FIG. 4, being a selected memory cell string will be described as an example. That is, referring to FIG. 4, the first memory cell string ST1 may be a selected memory cell string. The second to fourth memory cell strings ST2 to ST4 may be unselected memory cell strings.

Period t1 to t4 may be the potential adjustment period Potential adjustment. The potential adjustment period Potential adjustment may be a period in which a channel potential Unsel_channel of unselected memory cell strings, among a plurality of memory cell strings, is increased.

In period t1 to t2, the memory device 100 may apply an initial voltage Vinitial to a selected word line Sel_WL and unselected word lines Unsel_WL. In period t2-t4, the memory device 100 may apply a pass voltage Vpass to the selected word line Sel_WL and the unselected word lines Unsel_WL.

In the period t1 to t4, the memory device 100 may apply a select line voltage Vds to a selected drain select line Sel_DSL and a selected source select line Sel_SSL. The select line voltage Vds may be a higher voltage than a threshold voltage of a selected drain select transistor and a selected source select transistor, which are connected to the selected drain select line Sel_DSL and the selected source select line Sel_SSL. In an embodiment, the selected drain select line Sel_DSL may be the first drain select line DSL1, shown in FIG. 4. In an embodiment, the selected source select line Sel_SSL may be the first source select line SSL1, shown in FIG. 4.

In the period t1 to t4, the memory device 100 may apply a ground voltage Gnd to unselected drain select lines Unsel_DSL and an unselected source select line Unsel_SSL. In an embodiment, the unselected drain select lines Unsel_DSL may be the second to fourth drain select lines DSL2 to DSL4, shown in FIG. 4. In an embodiment, the unselected source select line Unsel_SSL may be the second source select line SSL2, shown in FIG. 4.

The channel potential Unsel_channel of the unselected memory cell strings may increase while the ground voltage Gnd is being applied to the unselected drain select lines Unsel_DSL and the unselected source select line Unsel_SSL. The channel potential Unsel_channel of the unselected memory cell strings may increase until a voltage of the unselected word lines Unsel_WL reaches the pass voltage Vpass. The channel potential Unsel_channel of the unselected memory cell strings may increase during period t1 to t3. In an embodiment, a magnitude of which the channel potential Unsel_channel of the unselected memory cell strings increases may be ΔP1.

Period t4 to t5 may be the sensing period Sensing. The sensing period Sensing may be a period in which data stored in memory cells is sensed according to a voltage or current of a bit line, which is changed when a read voltage Vrd is applied to the selected word line Sel_WL. In the period t4 to t5, the memory device 100 may apply the read voltage Vrd to the selected word line Sel_WL. The read voltage may be any one of the first to seventh read voltages Vr1 to Vr7, shown in FIG. 2.

Meanwhile, as the channel potential Unsel_channel of the unselected memory cell strings becomes larger, a time for which the plurality of word lines Sel_WL and Unsel_WL reach the pass voltage Vpass may become shorter. However, when a read voltage having a low level is applied to the selected word line Sel_WL after the channel potential Unsel_channel of the unselected memory cell strings increases by ΔP1, a soft erase phenomenon may occur in which charges stored in selected memory cells connected to the selected word line Sel_WL disappear. Also, when a read voltage having a low level is applied to the selected word line Sel_WL after the channel potential Unsel_channel of the unselected memory cell strings increases by ΔP1, a hot carrier injection (HCI) phenomenon may occur in which charges having high energy are injected into adjacent memory cells adjacent to the selected memory cells.

Accordingly, in order to reduce the occurrence of the soft erase phenomenon or the HCI phenomenon, the memory device 100 may adjust the extent to which the magnitude of the channel potential Unsel_channel of the unselected memory cell strings increases by changing at least one of a magnitude of the initial voltage Vinitial, a magnitude of the pass voltage Vpass, and a time for which the ground voltage Gnd is applied to the unselected select lines Unsel_DSL and Unsel_SSL.

Figure 6:
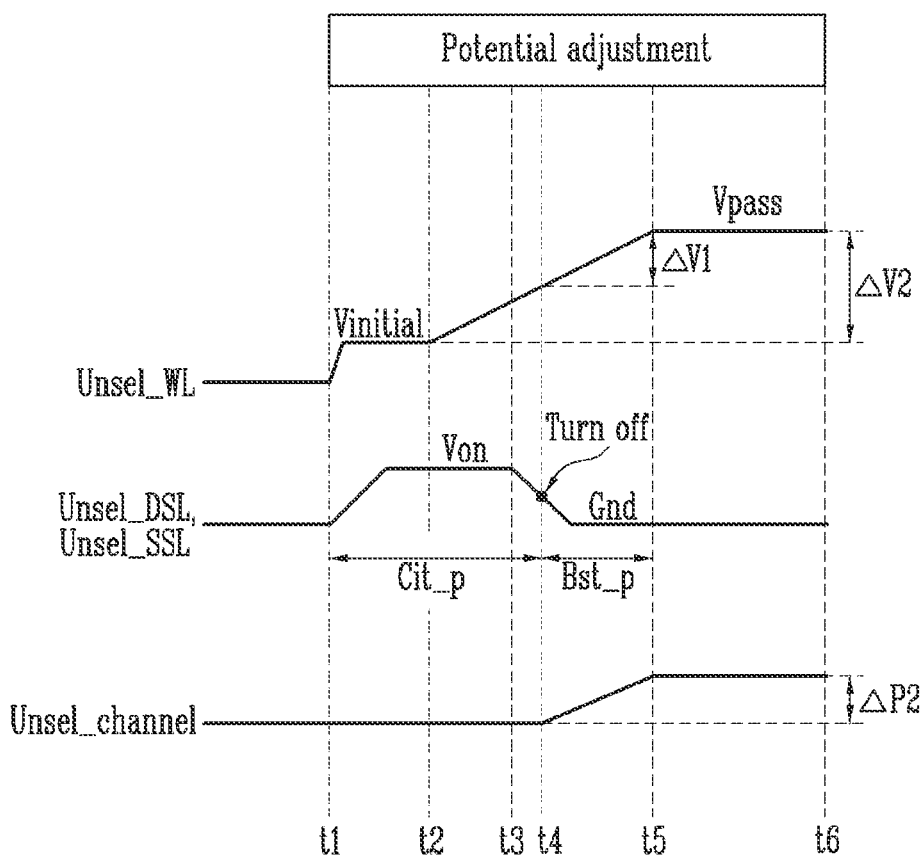
FIG. 6 is a diagram illustrating a boosting ratio.

FIG. 6 is a diagram illustrating a boosting ratio.

In FIG. 6, only the potential adjustment period Potential adjustment included in the read operation will be described. Referring to FIG. 6, the memory device 100 may apply the initial voltage Vinitial to the unselected word lines Unsel_WL and then may apply the pass voltage to the unselected word lines Unsel_WL.

In period t1 to t3, the memory device 100 may apply a turn-on voltage Von to the unselected drain select lines Unsel_DSL and the unselected source select line Unsel_SSL. The turn-on voltage Von may be a higher voltage than a threshold voltage of unselected drain select transistors and unselected source select transistors, which are connected to the unselected drain select lines Unsel_DSL and the unselected source line Unsel_SSL.

At time t3, the memory device 100 may apply the ground voltage Gnd to the unselected drain select lines Unsel_DSL and the unselected source line Unsel_SSL. At time t4, a voltage of the unselected drain select lines Unsel_DSL and the unselected source line Unsel_SSL may become lower than the threshold voltage of the unselected drain select transistors and the unselected source select transistors. That is, at time t4, the unselected drain select transistors and the unselected source select transistors may be turned off. When the unselected drain select transistors and the unselected source select transistors are turned off, the channel potential Unsel_channel of the unselected memory cell strings may increase. The channel potential Unsel_channel of the unselected memory cell strings may increase until the voltage of the unselected word lines Unsel_WL reaches the pass voltage Vpass. The channel potential Unsel_channel of the unselected memory cell strings may increase during period t4 to t5. In an embodiment, the extent to which the magnitude of the channel potential Unsel_channel of the unselected memory cell strings increases may be ΔP2.

In an embodiment, during the potential adjustment period Potential adjustment included in the read operation, the memory device 100 may apply the turn-on voltage Von to unselected select lines and then may apply the ground voltage Gnd to the unselected select lines, thereby adjusting the extent to which the magnitude of the channel potential Unsel_channel of the unselected memory cell strings increases. The ΔP2, shown in FIG. 6, may be smaller than the ΔP1, shown in FIG. 5. The unselected select lines may include the unselected drain select lines Unsel_DSL and the unselected source select line Unsel_SSL.

In an embodiment, the extent to which the magnitude of the channel potential Unsel_channel of the unselected memory cell strings increases may be determined based on a boosting ratio Boosting Ratio. The boosting ratio Boosting Ratio may be a ratio of a voltage magnitude ΔV1 of unselected word lines, which increases after unselected select transistors are turned off, with respect to a magnitude difference ΔV2 between the pass voltage and the initial voltage.

As the boosting ratio Boosting Ratio has a larger value, the extent to which the magnitude of the channel potential Unsel_channel of the unselected memory cell strings increases may become larger. As the boosting ratio Boosting Ratio has a smaller value, the extent to which the magnitude of the channel potential Unsel_channel of the unselected memory cell strings increases may become smaller.

The boosting ratio Boosting Ratio may be determined based on a magnitude of the initial voltage Vinitial, a magnitude of the pass voltage Vpass, and the time for which the turn-on voltage Von is applied to the unselected select lines. In an embodiment, the boosting ratio Boosting Ratio may have a smaller value as the magnitude of the initial voltage Vinitial becomes smaller. The boosting ratio Boosting Ratio may have a larger value as the magnitude of the initial voltage Vinitial becomes larger.

In an embodiment, the boosting ratio Boosting Ratio may have a smaller value as the magnitude of the pass voltage Vpass becomes smaller. The boosting ratio Boosting Ratio may have a larger value as the magnitude of the pass voltage Vpass becomes larger.

In an embodiment, the boosting ratio Boosting Ratio may have a smaller value as the time for which the turn-on voltage Von is applied to the unselected select lines becomes longer. The boosting ratio Boosting Ratio may have a larger value as the time for which the turn-on voltage Von is applied to the unselected select lines becomes shorter.

In an embodiment, period t1 to t4 may be a channel initialization period Cit_p. The channel initialization period Cit_p may be a period that begins when the turn-on voltage Von is applied to the unselected select lines and ends when the unselected select transistors are turned off. The period t4 to t5 may be a boosting period Bst_p. The boosting period Bst_p may be a period that begins when the unselected select transistors are turned off and ends when the voltage of the unselected word lines Unsel_WL reaches the pass voltage Vpass. During the boosting period Bst_p, the channel potential Unsel_channel of the unselected memory cell strings may increase.

In an embodiment, as the time for which the turn-on voltage Von is applied to the unselected select lines becomes longer, the channel initialization period Cit_p may become longer. In an embodiment, as the time for which the turn-on voltage Von is applied to the unselected select lines becomes shorter, the channel initialization period Cit_p may become shorter. As the channel initialization period Cit_p becomes longer or as the boosting period Bst_p becomes shorter, the extent to which the magnitude of the channel potential Unsel_channel of the unselected memory cell strings increases may become smaller.

In an embodiment, as the time for which the turn-on voltage Von is applied to the unselected select lines becomes shorter, the channel initialization period Cit_p may become shorter. In an embodiment, as the time for which the ground voltage Gnd is applied to the unselected select lines becomes longer, the boosting period Bst_p may become longer. As the channel initialization period Cit_p becomes shorter or as the boosting period Bst_p becomes longer, the extent to which the magnitude of the channel potential Unsel_channel of the unselected memory cell strings increases may become larger.

In an embodiment, the memory device 100 may adjust the extent to which the magnitude of the channel potential Unsel_channel of the unselected memory cell strings increases based on the boosting ratio Boosting Ratio. The memory device 100 may change the boosting ratio Boosting Ratio by changing at least one of the magnitude of the initial voltage Vinitial, the magnitude of the pass voltage Vpass, and the time for which the turn-on voltage Von is applied to the unselected select lines. The memory device 100 may change the extent to which the magnitude of the channel potential Unsel_channel of the unselected memory cell strings increases by changing the boosting ratio Boosting Ratio.

Figure 7:
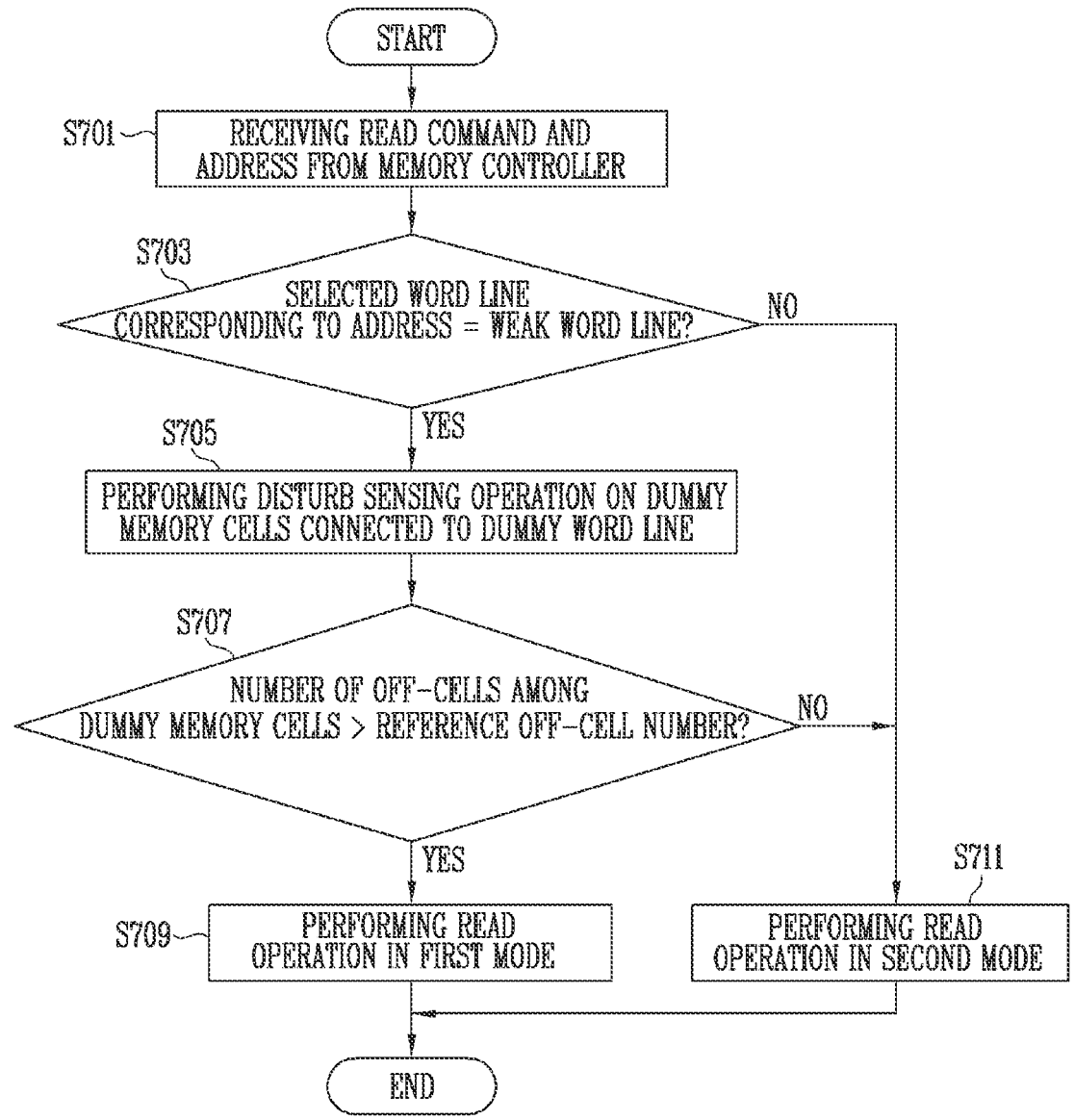
FIG. 7 is a flowchart illustrating a read operation according to a first mode or a second mode.

FIG. 7 is a flowchart illustrating a read operation according to a first mode or the second mode.

Referring to FIG. 7, in step S701, the memory device 100 may receive a read command and an address from the memory controller. The memory device 100 may select a word line corresponding to the address, among a plurality of word lines.

In step S703, the memory device 100 may determine whether the selected word line corresponding to the address is a weak word line. In an embodiment, the memory device 100 may compare whether the selected word line is included in weak word line information. The weak word line information may include information regarding word lines respectively connected to top areas of a first channel region and a second channel region, which are formed in different pillar structures. The weak word line may be a word line having a high probability that a soft erase phenomenon or a hot carrier injection phenomenon will occur as compared with other word lines.

In an embodiment, when the selected word line is included in the weak word line information, step S705 may be performed. When the selected word line is not included in the weak word line information, step S711 may be performed.

In step S705, when the selected word line is the weak word line, the memory device 100 may perform a disturb sensing operation on dummy memory cells connected to a dummy word line. The disturb sensing operation may be an operation that identifies a degree to which a threshold voltage of the dummy memory cells is changed by using a disturb voltage.

In step S707, the memory device 100 may decide whether a number of off-cells, among the dummy memory cells, is greater than a reference off-cell number. The number of off-cells may be a number of memory cells having a threshold voltage that is higher than the disturb voltage, among the dummy memory cells. When the number of off-cells is greater than the reference off-cell number, step S709 may be performed. When the number of off-cells is equal to or smaller than the reference off-cell number, step S711 may be performed.

In step S709, when the number of off-cells is greater than the reference off-cell number, the memory device 100 may perform a read operation in a first mode.

In step S711, when the number of off-cells is equal to or smaller than the reference off-cell number, the memory device 100 may perform a read operation in a second mode. When the selected word line is not included in the weak word line information, the memory device 100 may perform the read operation in the second mode.

In an embodiment, the second mode, an extent to which the magnitude of a channel potential of unselected memory cell strings among a plurality of memory cell strings increases in a potential adjustment period included in the read operation may be greater than an extent to which the magnitude of the channel potential of the unselected memory cell strings increases in the first mode. In an embodiment, in the second mode, a boosting ratio is greater than a boosting ratio in the first mode. In an embodiment, when the selected word line is the weak word line, the memory device 100 may perform the read operation in the first mode, based on a result obtained by performing the disturb sensing operation on the dummy memory cells, so that the extent to which the magnitude of the channel potential of the unselected memory cell strings increases can be decreased.

Figure 8:
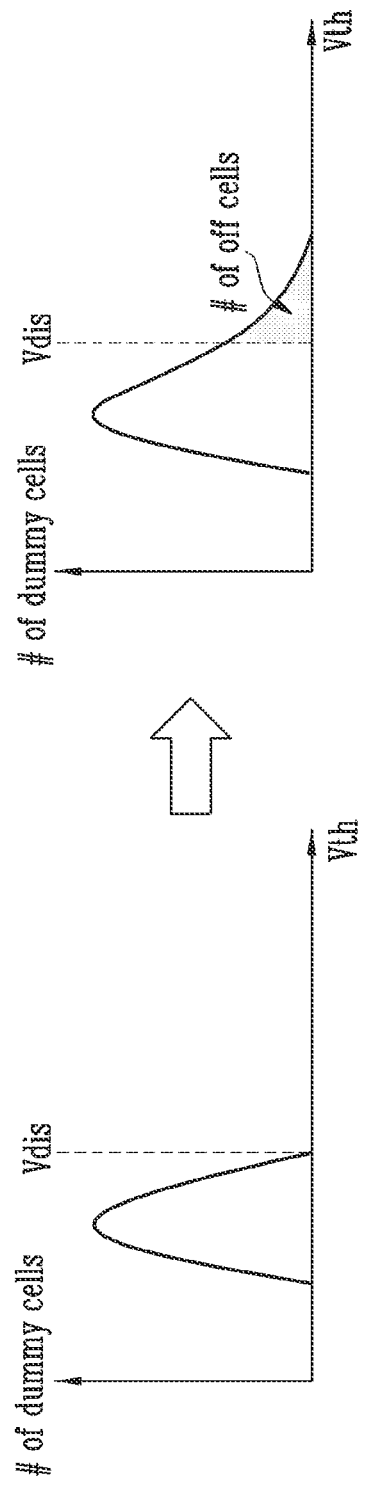
FIG. 8 is a diagram illustrating a disturb sensing operation.

FIG. 8 is a diagram illustrating a disturb sensing operation.

In FIG. 8, the horizontal axis of each graph represents threshold voltage Vth of dummy memory cells, and the vertical axis of each graph represents a number of dummy memory cells (# of dummy cells).

Referring to the left graph, dummy memory cells may have a threshold voltage distribution corresponding to any one of the erase state E and the first to seventh program states PV1 to PV7, which are shown in FIG. 2. The dummy memory cells may have a threshold voltage that is lower than a disturb voltage Vdis.

In an embodiment, the dummy memory cells may be dummy memory cells connected to the drain-side dummy word line DDWL, shown in FIG. 2. The dummy memory cells may be dummy memory cells connected to the source-side dummy word line SDWL, shown in FIG. 2.

The threshold voltage distribution of the dummy memory cells may be changed from the left graph to the right graph as time elapses. For example, as a program, erase, or read operation on a plurality of memory cells is repeatedly performed, a number of off-cells (# of off-cells) having a threshold voltage that is higher than the disturb voltage Vdis, among the dummy memory cells, may increase.

The memory device 100 may perform a disturb sensing operation that identifies a degree to which the threshold voltage of the dummy memory cells is changed when a selected word line corresponds to a weak word line. In the disturb sensing operation, the memory device 100 may count the number of off-cells (# of off-cells) having a threshold voltage that is higher than the disturb voltage Vdis, among the dummy memory cells. The memory device 100 may perform a read operation in any one of the first mode and the second mode based on a result obtained by comparing the number of off-cells (# of off-cells) with a reference off-cell number.

Figure 9:
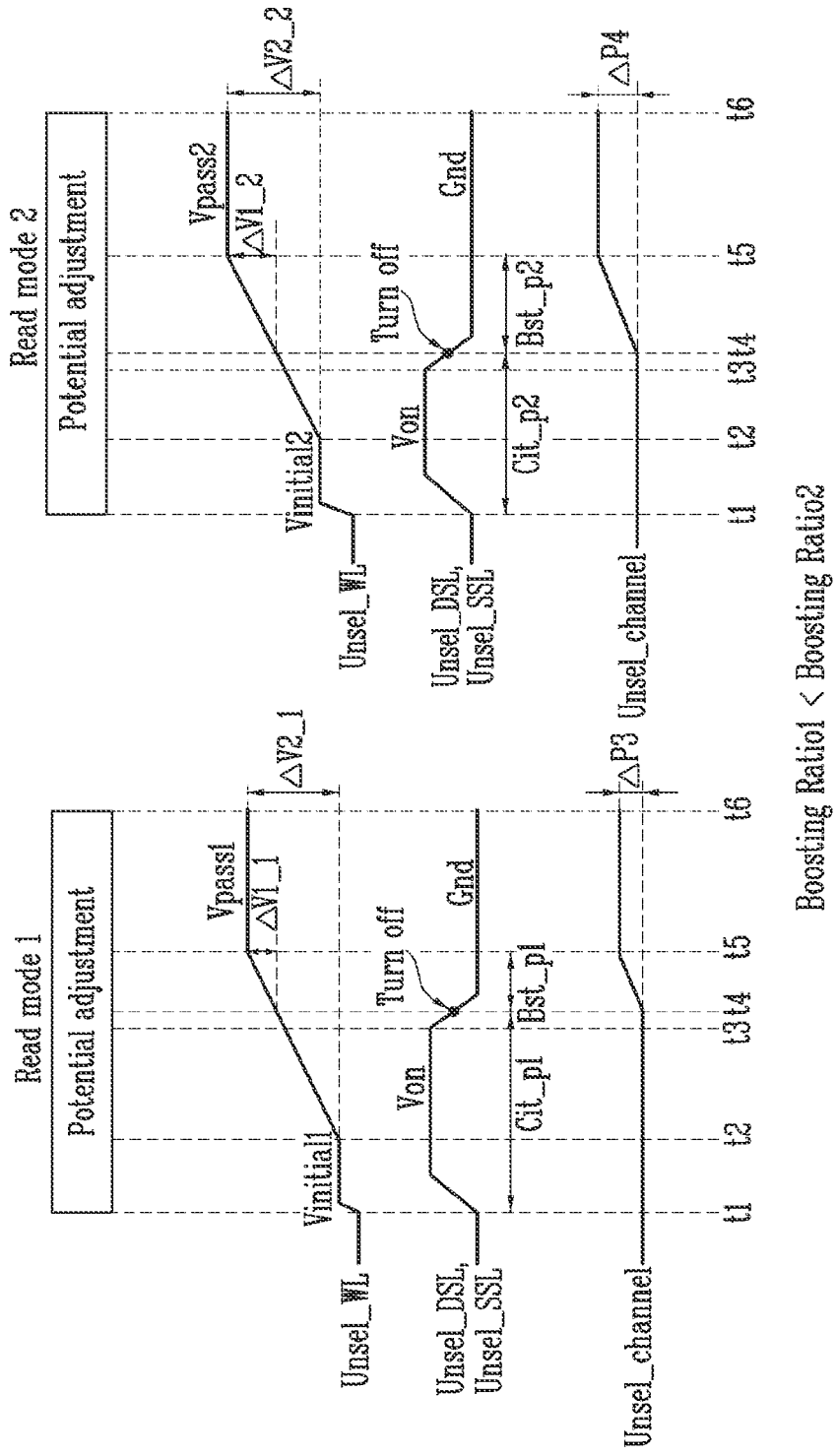
FIG. 9 is a diagram illustrating a read operation according to the first mode or the second mode.

FIG. 9 is a diagram illustrating a read operation according to the first mode or the second mode.

A sensing period included in the read operation is the same in both the first mode and the second mode as shown in FIG. 5, and therefore, only a potential adjustment period Potential adjustment will be described in FIG. 9.

Referring to FIG. 9, when a number of off-cells, among dummy memory cells, is greater than a reference off-cell number, the memory device 100 may perform a read operation that reads data stored in selected memory cells connected to a selected word line in a first mode Read mode 1. When the number of off-cells, among the dummy memory cells, is equal to or smaller than the reference off-cell number, the memory device 100 may perform a read operation that reads data stored in the selected memory cells in a second mode Read mode 2.

In an embodiment, the memory device 100 may determine a boosting ratio as a first boosting ratio Boosting Ratio 1 in the read operation in the first mode. The first boosting ratio Boosting Ratio 1 may be a ratio of a voltage magnitude ΔV1_1 of unselected word lines, which increases after unselected transistors are turned off, with respect to a magnitude difference ΔV2_1 between a first pass voltage and a first initial voltage.

The memory device 100 may determine the boosting ratio as a second boosting ratio Boosting Ratio 2 that is greater than the first boosting ratio Boosting Ratio 1 in the read operation in the second mode. The second boosting ratio Boosting Ratio 2 may be a ratio of a voltage magnitude ΔV1_2 of the unselected word lines, which increases after the unselected transistors are turned off, with respect to a magnitude difference ΔV2_2 between a second pass voltage and a second initial voltage.

A magnitude of an initial voltage or a magnitude of a pass voltage at the first boosting ratio Boosting Ratio 1 may be smaller than a magnitude of the initial voltage or a magnitude of the pass voltage at the second boosting ratio Boosting Ratio 2, respectively, or a time for which a turn-on voltage is applied to unselected select lines at the first boosting ratio Boosting Ratio 1 may be longer than a time for which the turn-on voltage is applied to the unselected select lines at the second boosting ratio Boosting Ratio 2.

Specifically, the memory device 100 may apply a first initial voltage Vinitial1 to unselected word lines Unsel_WL in the read operation in the first mode. The memory device 100 may apply a second initial voltage Vinitial2, which is higher than the first initial voltage Vinitial1, to the unselected word lines Unsel_WL in the read operation in the second mode.

In an embodiment, the memory device 100 may apply a first pass voltage Vpass1 to the unselected word lines Unsel_WL in the read operation in the first mode. The memory device 100 may apply a second pass voltage Vpass2, which is higher than the first pass voltage Vpass1, to the unselected word lines Unsel_WL in the read operation in the second mode.

In an embodiment, during period t1 to t3, the memory device 100 may apply a turn-on voltage Von to unselected drain select lines Unsel_DSL and an unselected source select line Unsel_SSL in the read operation in the first mode. During the period t1 to t3, the memory device 100 may apply the turn-on voltage Von to the unselected drain select lines Unsel_DSL and the unselected source select line Unsel_SSL in the read operation in the second mode. In the first mode, a time for which the turn-on voltage Von is applied to the unselected drain select lines Unsel_DSL and the unselected source select line Unsel_SSL may be longer than a time for which the turn-on voltage Von is applied to the unselected drain select lines Unsel_DSL and the unselected source select line Unsel_SSL in the second mode.

In an embodiment, during period t3 to t6, the memory device 100 may apply a ground voltage Gnd to the unselected drain select lines Unsel_DSL and the unselected source select line Unsel_SSL in the read operation in the first mode. During the period t3 to t6, the memory device 100 may apply the ground voltage Gnd to the unselected drain select lines Unsel_DSL and the unselected source select line Unsel_SSL in the read operation in the second mode. In the first mode, a time for which the ground voltage Gnd is applied to the unselected drain select lines Unsel_DSL and the unselected source select line Unsel_SSL may be shorter than a time for which the ground voltage Gnd is applied to the unselected drain select lines Unsel_DSL and the unselected source select line Unsel_SSL in the second mode.

In an embodiment, a length of a first channel initialization period Cit_p1 in the first mode may be longer than a length of a second channel initialization period Cit_p2 in the second mode. In the first mode, a time for which a channel potential is initialized may be longer than a time for which the channel potential is initialized in the second mode.

In an embodiment, a length of a first boosting period Bst_p1 in the first mode may be shorter than a length of a second boosting period Bst_p2 in the second mode. In the first mode, a time for which a channel potential of unselected memory cell strings increases may be shorter than a time for which the channel potential of the unselected memory cell strings increases in the second mode.

In the first mode, an extent to which the magnitude of the channel potential Unsel_channel of the unselected memory cell strings increases may be ΔP3. In the second mode, an extent to which the magnitude of the channel potential Unsel_channel of the unselected memory cell strings increases may be ΔP4 greater than the P3. In the first mode, an extent to which the magnitude of the channel potential Unsel_channel of the unselected memory cell strings increases may be smaller than an extent to which the magnitude of the channel potential Unsel_channel of the unselected memory cell strings increases in the second mode.

Figure 10:
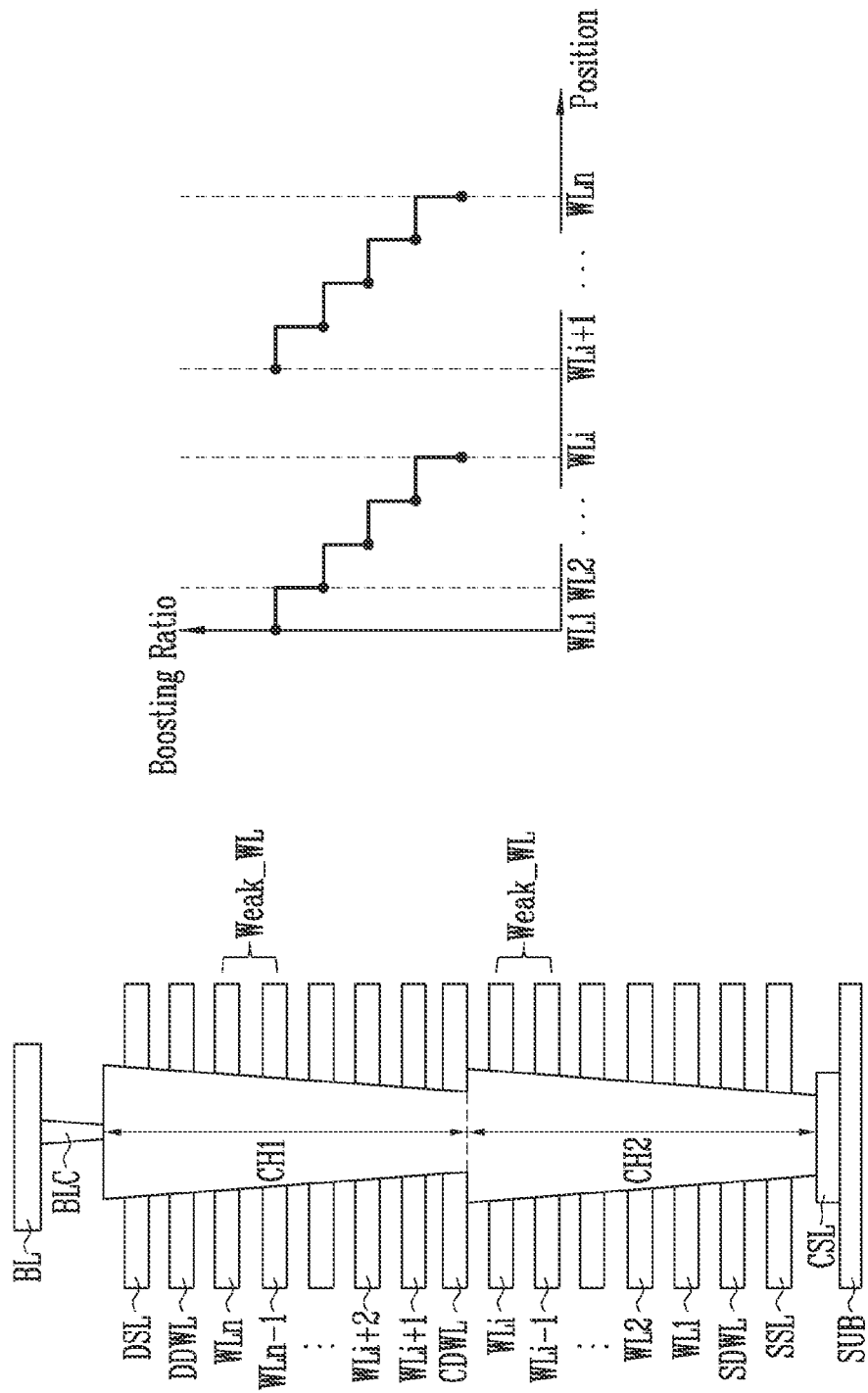
FIG. 10 is a diagram illustrating a boosting ratio changed according to a position of a selected word line.

FIG. 10 is a diagram illustrating a boosting ratio changed according to a position of a selected word line.

Referring to FIG. 10, any one memory cell string, among a plurality of memory cells strings, may be connected to a drain select line DSL, a drain-side dummy word line DDWL, a plurality of word lines WL1 to WLn, a central dummy word line CDWL, a source-side dummy word line SDWL, and a source select line SSL. The one memory cell string may include a first channel region CH1 and a second channel region CH2, which are formed in different pillar structures. The first channel region CH1 may be a channel region formed in an upper pillar structure. The first channel region CH1 may be electrically connected to a bit line BL through a bit line contact plug BLC. The second channel region CH2 may be a channel region formed in a lower pillar structure. The second channel region CH2 may be connected to a common source line CSL. The common source line CSL may be in contact with a substrate SUB.

In an embodiment, word lines respectively connected to top areas of the first channel region CH1 and the second channel region CH2 may be weak word lines Weak_WL. For example, an (n−1) th word line WLn−1 and an nth word line WLn, which are connected to the top area of the first channel region CH1, may be weak word lines. An (i−1) th word line WLi−1 and an ith word line WLi, which are connected to the top area of the second channel region CH2, may be weak word lines. In an embodiment, the memory device 100 may store weak word line information corresponding to positions of the weak word lines in the weak word line information storage 150, shown in FIG. 1.

In an embodiment, the memory device 100 may determine a boosting ratio Boosting Ratio based on a position of a selected word line. The memory device 100 may determine the boosting ratio as a smaller value as the selected word line is located closer to the top area of the first channel region CH1 or the second channel region CH2. For example, when the selected word line is the nth word line WLn or the ith word line WLi, the memory device 100 may determine the boosting ratio as a smallest value.

The memory device 100 may determine the boosting ratio as a larger value as the selected word line is located closer to a bottom area of the first channel region CH1 or the second channel region CH2. For example, when the selected word line is a first word line WL1 or an (i+1) th word line WLi+1, the memory device 100 may determine the boosting ratio as a largest value.

The boosting ratio may be decreased in a stepwise manner as the selected word line is located closer to the top area of the first channel region CH1 or the second channel region CH2. The boosting ratio may have a smaller value as at least one of an initial voltage, a pass voltage, and a time for which a ground voltage is applied to unselected select lines becomes smaller or shorter. The boosting ratio may be increased in a stepwise manner as the selected word line is located closer to the bottom area of the first channel region CH1 or the second channel region CH2. The boosting ratio may have a larger value as at least one of the initial voltage, the pass voltage, and the time for which a ground voltage is applied to unselected select lines becomes larger or longer.

In a read operation, an extent to which the magnitude of a channel potential of unselected memory cell strings among the plurality of memory cell strings increases may be determined according to the boosting ratio. As the boosting ratio becomes larger, the extent to which the magnitude of the channel potential of the unselected memory cell strings increases may become larger. As the boosting ratio becomes smaller, the extent to which the magnitude of the channel potential of the unselected memory cell strings increases may become smaller. In the read operation, the memory device 100 may change the boosting ratio according to the position of the selected word line and may change the extent to which the magnitude of the channel potential of the unselected memory cell strings increases according to the boosting ratio.

Figure 11:
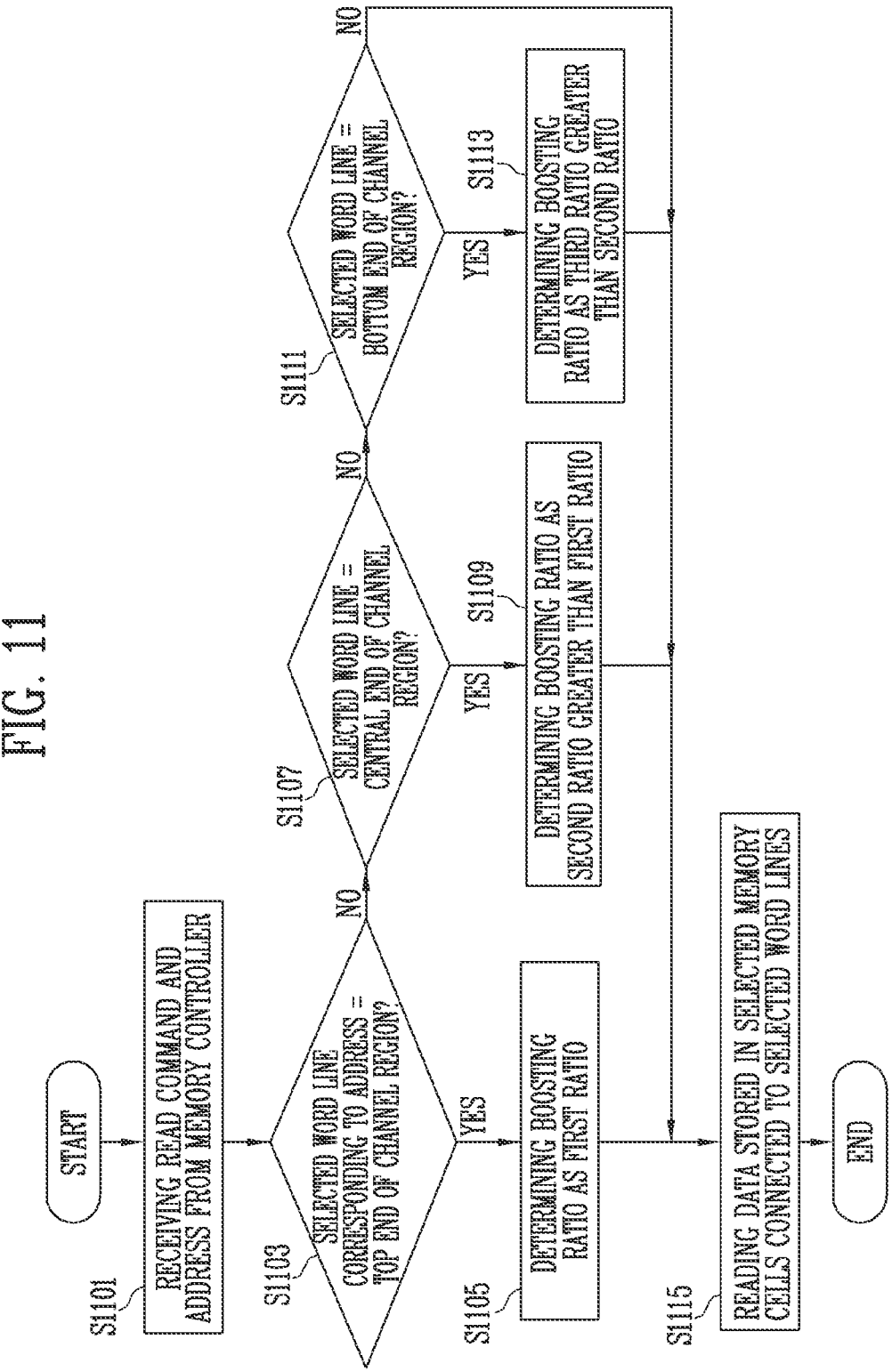
FIG. 11 is a flowchart illustrating a read operation performed based on a boosting ratio determined according to a position of a selected word line.

FIG. 11 is a flowchart illustrating a read operation performed based on a boosting ratio determined according to a position of a selected word line.

Referring to FIG. 11, in step S1101, the memory device 100 may receive a read command and an address from the memory controller.

In step S1103, the memory device 100 may decide whether a selected word line corresponding to the address is a word line connected to a top area of a channel region. In an embodiment, the word line connected to the top area of the channel region may correspond to the (i−1) th word line WLi−1, the ith word line WLi, the (n−1) th word line WLn−1, and the nth word line WLn, which are shown in FIG. 10. When the selected word line is the word line connected to the top area of the channel region, step S1105 may be performed. When the selected word line is not the word line connected to the top area of the channel region, step S1107 may be performed.

In step S1105, when the selected word line is the word line connected to the top area of the channel region, the memory device 100 may determine a boosting ratio as a first ratio.

In step S1107, the memory device 100 may decide whether the selected word line is a word line connected to a central area of the channel region. In an embodiment, the word line connected to the central area of the channel region may correspond to a word line connected between a second word line WL2 and the (i−1) th word line WLi−1, which are shown in FIG. 10, and a word line connected between an (i+2) th word line WLi+2 and the (n−1) th word line WLn−1, which are shown in FIG. 10. When the selected word line is the word line connected to the central area of the channel region, step S1109 may be performed. When the selected word line is not the word line connected to the central area of the channel region, step S1111 may be performed.

In step S1109, when the selected word line is the word line connected to the central area of the channel region, the memory device 100 may determine the boosting ratio as a second ratio, which is greater than the first ratio. A magnitude of an initial voltage or a magnitude of a pass voltage, which is applied to unselected word lines, at the first ratio may be smaller than a magnitude of the initial voltage or a magnitude of the pass voltage at the second ratio, respectively, or a time for which a ground voltage is applied to unselected select lines at the first ratio may be shorter than a time for which the ground voltage is applied to the unselected select lines at the second ratio. At the first ratio, a time for which a turn-on voltage is applied to the unselected select lines may be longer than a time for which the turn-on voltage is applied to the unselected select lines at the second ratio.

In step S1111, the memory device 100 may decide whether the selected word line is a word line connected to a bottom area of the channel region. In an embodiment, the word line connected to the bottom area of the channel region may correspond to the first word line WL1, the second word line WL2, the (i+1) th word line WLi+1, and the (i+2) th word line WLi+2, which are shown in FIG. 10.

In step S1113, when the selected word line is the word line connected to the bottom area of the channel region, the memory device 100 may determine the boosting ratio as a third ratio, which is greater than the second ratio.

In step S1115, the memory device 100 may read data stored in selected memory cells connected to selected word lines. Specifically, the memory device 100 may increase a channel potential of unselected memory cell strings according to the determined boosting ratio and then may sense the data stored in the memory cells by using a read voltage.

In accordance with the present disclosure, there can be provided a memory device capable of reducing a disturbance phenomenon in which a threshold voltage distribution of memory cell is changed in a read operation.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein.

What is claimed is:

1. A memory device comprising:
   a plurality of memory cell strings including a plurality of memory cells connected to a plurality of word lines;
   a peripheral circuit configured to perform a read operation that reads data stored selected memory cells connected to a selected word line among the plurality of word lines; and
   a read operation controller configured to control the peripheral circuit to perform the read operation,
   wherein the read operation controller configured to:
   control the peripheral circuit to perform the read operation in a first mode based on a result obtained by performing a disturb sensing operation that identifies a degree to which a threshold voltage of dummy memory cells connected to a dummy word line is changed when selected word line is included in weak word line information, and
   control the peripheral circuit to perform the read operation in a second mode,
   wherein, an extent to which a magnitude of a channel potential of unselected memory cell strings, among the plurality of memory cell strings, increases in the first mode is smaller than an extent to which a magnitude of the channel potential of the unselected memory cell strings increases in the second mode.

2. The memory device of claim 1, further comprising a weak word line information storage configured to store the weak word line information corresponding to weak word lines, among the plurality of word lines,
   wherein the weak word line information includes word lines respectively connected to top areas of a first channel region and a second channel region, which are formed in different pillar structure.

3. The memory device of claim 1, wherein the disturb sensing operation is an operation that counts a number of off-cells having a threshold voltage that is higher than a disturb voltage, among the dummy memory cells.

4. The memory device of claim 3, wherein, when the number of off-cells is greater than a reference off-cell number, the read operation controller controls the peripheral circuit to perform the read operation in the first mode.

5. The memory device of claim 4, wherein, when the number of off-cells is equal to or smaller than the reference off-cell number, the read operation controller controls the peripheral circuit to perform the read operation in the second mode.

6. The memory device of claim 5, wherein the read operation controller controls the peripheral circuit to apply a turn-on voltage to unselected select lines connected to the unselected memory cell strings during a first period in the first mode and to apply the turn-on voltage to the unselected select lines during a second period, which is shorter than the first period, in the second mode.

7. The memory device of claim 5, wherein the read operation controller controls the peripheral circuit to:
   apply a first initial voltage to the plurality of word lines, then apply a first pass voltage to the plurality of word lines, and then apply a read voltage to the selected word line in the first mode, and
   apply a second initial voltage to the plurality of word lines, then apply a second pass voltage to the plurality of word lines, and then apply the read voltage to the selected word line in the second mode, and
   wherein the first initial voltage is lower than the second initial voltage, or the first pass voltage is lower than the second pass voltage.

8. The memory device of claim 1, wherein the read operation includes:
a potential adjustment period in which an initial voltage is applied to the plurality of word lines and then a pass voltage is applied to the plurality of word lines, and a turn-on voltage is applied to unselected select lines connected to the unselected memory cell strings and then a ground voltage is applied to the unselected select lines, and
a sensing period in which a read voltage is applied to the selected word line.

9. The memory device of claim 8, wherein the extent to which the magnitude of the channel potential of the unselected memory cell strings increases is determined based on a boosting ratio, the boosting ratio being a ratio of a magnitude of a voltage of the unselected word lines, which increases after unselected select transistors connected to the unselected select lines are turned off, with respect to a magnitude difference between the pass voltage and the initial voltage in the potential adjustment period.

10. The memory device of claim 9, wherein the read operation controller determines the boosting ratio as a first ratio in the first mode and determines the boosting ratio as a second ratio, which is greater than the first ratio, in the second mode.

11. The memory device of claim 10, wherein a magnitude of the initial voltage or a magnitude of the pass voltage at the first ratio is smaller than a magnitude of the initial voltage or a magnitude of the pass voltage at the second ratio, respectively, or a time for which the turn-on voltage is applied to the unselected select lines at the first ratio is longer than a time for which the turn-on voltage is applied to the unselected select lines at the second ratio.

12. The memory device of claim 1, wherein the dummy word line is connected between a drain select line and the plurality of word lines or between a source select line and the plurality of word lines.

13. A memory device comprising:
a plurality of memory cell strings including a plurality of memory cells connected to a plurality of word lines;
a peripheral circuit configured to perform a read operation that reads data stored selected memory cells connected to a selected word line among the plurality of word lines; and
a read operation controller configured to, in the read operation, control the peripheral circuit to change an extent to which the magnitude of a channel potential of unselected memory cell strings, among the plurality of memory cell strings, increases according to a position of the selected word line within a channel region formed in a pillar structure.

14. The memory device of claim 13, wherein the read operation includes:
a potential adjustment period in which an initial voltage is applied to the plurality of word lines and then a pass voltage is applied to the plurality of word lines, and a turn-on voltage is applied to unselected select lines connected to the unselected memory cell strings and then a ground voltage is applied to the unselected select lines, and
a sensing period in which a read voltage is applied to the selected word line.

15. The memory device of claim 14, wherein the extent to which the magnitude of the channel potential of the unselected memory cell strings increases is determined based on a boosting ratio, the boosting ratio being a ratio of a magnitude of a voltage of the unselected word lines, which increases after unselected select transistors connected to the unselected select lines are turned off, with respect to a magnitude difference between the pass voltage and the initial voltage.

16. The memory device of claim 15, wherein the boosting ratio is determined based on at least one of the magnitude of the initial voltage, the magnitude of the pass voltage, and a time for which the ground voltage is applied to the unselected select lines.

17. The memory device of claim 15, wherein the read operation controller determines the boosting ratio to be a first ratio when the selected word line is included at a top area of a first channel region or a second channel region, which are formed in different pillar structures, and determines the boosting ratio to be a second ratio, which is greater than the first ratio, when the selected word line is included at a central area of the first channel region or the second channel region.

18. The memory device of claim 17, wherein at least one of a magnitude of the initial voltage, a magnitude of the pass voltage, and a time for which the ground voltage is applied to the unselected select lines at the first ratio is smaller or shorter than at least one of a magnitude of the initial voltage, a magnitude of the pass voltage, and a time for which the ground voltage is applied to the unselected select lines at the second ratio, respectively.

19. The memory device of claim 17, wherein, when the selected word line is included at a bottom area of the first channel region or the second channel region, the read operation controller determines the boosting ratio to be a third ratio, which is greater than the second ratio.

20. The memory device of claim 15, wherein the boosting ratio has a smaller value as the selected word line is located closer to a top area of a first channel region or a second channel region, the first channel region and the second channel region being formed in different pillar structures.

* * * * *